US009844090B2

(12) United States Patent
Yi et al.

(10) Patent No.: US 9,844,090 B2
(45) Date of Patent: *Dec. 12, 2017

(54) SIGNAL PROCESSING METHOD IN WIRELESS COMMUNICATION SYSTEM AND RELAY NODE THEREFOR

(71) Applicant: LG Electronics Inc., Seoul (KR)

(72) Inventors: Seung June Yi, Anyang-si (KR); Sung Duck Chun, Anyang-si (KR); Jae Wook Lee, Anyang-si (KR); Sung Hoon Jung, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 104 days.

This patent is subject to a terminal disclaimer.

(21) Appl. No.: 14/541,810

(22) Filed: Nov. 14, 2014

(65) Prior Publication Data

US 2015/0071056 A1   Mar. 12, 2015

Related U.S. Application Data

(63) Continuation of application No. 14/298,600, filed on Jun. 6, 2014, now Pat. No. 9,148,900, which is a
(Continued)

(51) Int. Cl.
*H04L 12/28* (2006.01)
*H04W 76/02* (2009.01)
(Continued)

(52) U.S. Cl.
CPC .......... *H04W 76/028* (2013.01); *H04B 7/155* (2013.01); *H04L 45/28* (2013.01);
(Continued)

(58) Field of Classification Search
CPC ... H04W 76/028; H04W 36/06; H04W 16/26; H04W 56/003; H04W 56/00;
(Continued)

(56) References Cited

U.S. PATENT DOCUMENTS 8,493,996 B2 *  7/2013  Strzyz .................. H04W 36/06
                                                      370/321
8,599,771 B2 * 12/2013  Gholmieh ......... H04W 72/0406
                                                      370/228
(Continued)

FOREIGN PATENT DOCUMENTS

CN       101166055 A      4/2008
CN       101668340 A      3/2010
(Continued)

OTHER PUBLICATIONS

NTT Docomo, Inc., "Rel-9 RLF handling enhancements," 3GPP TSG-RAN WG2 #67, Tdoc-R2-094890, Shenzhen, China, Aug. 24-28, 2009 (retrieved from internet on Aug. 18, 2009), pp. 1-5.
(Continued)

*Primary Examiner* — Melanie Jagannathan
(74) *Attorney, Agent, or Firm* — Birch, Stewart, Kolasch & Birch, LLP

(57) ABSTRACT

A method is described for operating a device in a wireless communication system. The device communicates with a base station using a subframe for the device only; detects, by the device, a problem with a connection between the device and the base station. The device starts a timer upon detecting the problem with the connection between the device and the base station. The device releases a restriction of using the subframe for the device only, if the timer expires. The problem with the connection between the device and the base station is associated with a radio link failure. The detection of a problem with the connection between the
(Continued)

device and the base station comprises detecting consecutive out-of-sync indications.

14 Claims, 7 Drawing Sheets

Related U.S. Application Data continuation of application No. 13/322,060, filed as application No. PCT/KR2011/002260 on Apr. 1, 2011, now Pat. No. 8,780,698.

(60) Provisional application No. 61/320,298, filed on Apr. 1, 2010.

(51) Int. Cl.
*H04W 56/00* (2009.01)
*H04B 7/155* (2006.01)
*H04L 12/703* (2013.01)
*H04W 16/26* (2009.01)
*H04W 72/04* (2009.01)
*H04W 76/04* (2009.01)

(52) U.S. Cl.
CPC ........... *H04W 16/26* (2013.01); *H04W 56/00* (2013.01); *H04W 56/003* (2013.01); *H04W 72/0413* (2013.01); *H04W 76/046* (2013.01); *H04W 76/027* (2013.01)

(58) Field of Classification Search
CPC ........... H04W 76/046; H04W 36/0033; H04W 52/0258; H04W 76/068
See application file for complete search history.

(56) References Cited

U.S. PATENT DOCUMENTS

| | | | | |
|---|---|---|---|---|
| 8,665,773 | B2* | 3/2014 | Bhat | H04B 7/15542 370/315 |
| 2003/0207702 | A1* | 11/2003 | Chen | H04W 52/0258 455/574 |
| 2008/0049671 | A1 | 2/2008 | Koo et al. | |
| 2008/0074994 | A1* | 3/2008 | Jen | H04W 76/028 370/218 |
| 2008/0318578 | A1* | 12/2008 | Worrall | H04W 36/02 455/437 |
| 2009/0049356 | A1 | 2/2009 | Lin | |
| 2009/0061878 | A1* | 3/2009 | Fischer | G08C 17/02 455/436 |
| 2009/0285111 | A1* | 11/2009 | Ou | H04W 72/1284 370/252 |
| 2010/0041389 | A1* | 2/2010 | Cave | H04W 76/028 455/423 |
| 2010/0271999 | A1* | 10/2010 | Yu | H04B 7/155 370/312 |
| 2011/0053588 | A1* | 3/2011 | Al-Khudairi | H04W 36/30 455/424 |
| 2011/0081903 | A1* | 4/2011 | Cai | H04W 36/0055 455/424 |
| 2011/0164587 | A1 | 7/2011 | Seo | |
| 2011/0183663 | A1* | 7/2011 | Kenehan | H04W 76/048 455/423 |
| 2011/0211458 | A1* | 9/2011 | Ishii | H04W 76/028 370/242 |
| 2011/0222428 | A1* | 9/2011 | Charbit | H04B 7/15557 370/252 |
| 2011/0242970 | A1* | 10/2011 | Prakash | H04W 76/068 370/225 |
| 2011/0249558 | A1* | 10/2011 | Raaf | H04B 7/2606 370/237 |
| 2012/0142336 | A1* | 6/2012 | Van Phan | H04W 36/0033 455/423 |

FOREIGN PATENT DOCUMENTS

| | | |
|---|---|---|
| EP | 1830490 A1 | 9/2007 |
| JP | 9-162871 A | 6/1997 |
| JP | 2003-283414 A | 10/2003 |
| JP | 2009-528804 A | 8/2009 |
| JP | 2009-284469 A | 12/2009 |
| KR | 10-2007-0069360 A | 7/2007 |
| KR | 10-2007-0090715 A | 9/2007 |
| KR | 10-2009-0004688 A | 1/2009 |
| KR | 10-2009-0033238 A | 4/2009 |
| KR | 10-2010-0027925 A | 3/2010 |
| WO | WO 2008/087524 A2 | 7/2008 |
| WO | WO 2010/006285 A2 | 1/2010 |
| WO | WO 2010/031439 A1 | 3/2010 |
| WO | WO 2010/032775 A1 | 3/2010 |

OTHER PUBLICATIONS

Teyeb et al., "Dynamic Relaying in 3GPP LTE-Advanced Networks," EURASIP Journal on Wireless Communications and Networking, vol. 2009, Article ID 731317, 2009, pp. 1-11.

* cited by examiner

SIGNAL PROCESSING METHOD IN WIRELESS COMMUNICATION SYSTEM AND RELAY NODE THEREFOR

CROSS-REFERENCE TO RELATED APPLICATIONS

This application is a Continuation of U.S. application Ser. No. 14/298,600 filed on Jun. 6, 2014, which issued as U.S. Pat. No. 9,148,900 on Sep. 29, 2015, which is a Continuation of U.S. application Ser. No. 13/322,060 filed on Nov. 22, 2011, which issued as U.S. Pat. No. 8,780,698 on Jul. 15, 2014, which is a National Phase application of PCT/KR2011/002260 filed on Apr. 1, 2011, which claims the benefit under 35 U.S.C. §119(e) of U.S. Provisional Application No. 61/320,298 filed on Apr. 1, 2010. The contents of all of these applications are hereby incorporated by reference as fully set forth herein in their entirety.

BACKGROUND OF THE INVENTION

Field of the Invention

The present invention relates to a method for processing signals in a wireless communication system.

Description of the Related Art

As an example of a mobile communication system to which the present invention is applicable, a $3^{rd}$ Generation Partnership Project Long Term Evolution (3GPP LTE) will be briefly described.

An LTE system is a mobile communication system evolved from a Universal Mobile Telecommunications System (UMTS) system and the standard thereof is established in the 3GPP. The schematic structure of the LTE system is shown in FIG. 1.

FIG. 1 is a diagram showing a network architecture of an LTE system which is an example of a mobile communication system.

The structure of the LTE system may be roughly divided into an Evolved UMTS Terrestrial Radio Access Network (E-UTRAN) and an Evolved Packet Core (EPC).

The E-UTRAN includes at least one eNB (Evolved Node B or base station). An interface between a UE and an eNB is referred to as a Uu interface and an interface between an eNB and another eNB is referred to as a X2 interface.

The EPC includes a mobility management entity (MME) for performing a control plane function and a serving gateway (S-GW) for performing a user plane function. An interface between an eNB and an MME is referred to as an S1-MME interface and an interface between an eNB and an S-GW is referred to as an S1-U interface. These interfaces may be collectively referred to as an S1 interface.

In a radio Uu interface, a radio interface protocol is defined. The radio interface protocol is horizontally divided into a physical layer, a data link layer and a network layer. The radio interface protocol is vertically divided into a user plane (U-plane) for transmitting user data and a control plane (C-plane) for signaling a control signal.

The radio interface protocol may be divided into L1 (first layer) including a physical layer (PHY), L2 (second layer) including a MAC/RLC/PDCP layer, and L3 (third layer) including a RRC layer based on the three lower layers of an open system interconnection (OSI) standard model which is well-known in the art of communication systems, as shown in FIGS. 2 and 3. A pair of radio interface protocols exist in a UE and an E-UTRAN to perform a data transmission function of a Uu interface.

SUMMARY OF THE INVENTION

An object of the present invention devised to solve the problem lies in a method for receiving control information in a wireless communication system and an apparatus thereof.

Another object of the present invention devised to solve the problem lies in control of a relay node (RN) subframe if a problem occurs in connection of a Un interface between a donor eNB (DeNB) and an RN in an LTE-A system, in which, when a problem occurs in the Un interface, the RN releases the RN subframe and operates as a general UE so as to prevent interference when recovering the Un interface and to prevent the UE from attempting data transmission.

The object of the present invention can be achieved by providing a method for processing signals by a wireless node in a wireless communication system, including configuring a specific subframe for communicating with a network node, starting a timer if a problem of a connection with the network node is detected, and releasing the configured specific subframe if the timer expires.

The method may further include performing recovery of problem using the specific subframe while the timer is running.

The method may further include performing a connection with the network node using any subframe if the timer expires.

The method may further include transitioning to a radio resource control (RRC) idle state if the timer expires, and performing a cell selection procedure.

The connection problem may be radio link failure (RLF), and the network node may be a Node B.

According to the embodiments of the present invention, when a problem occurs in an Un interface, the Un interface is recovered using a relay node (RN) subframe up to an appropriate point of time, such that a time required for solving the problem of the Un interface is optimized.

The effects of the present invention are not limited to the above-described effects and other effects which are not described herein will become apparent to those skilled in the art from the following description.

BRIEF DESCRIPTION OF DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
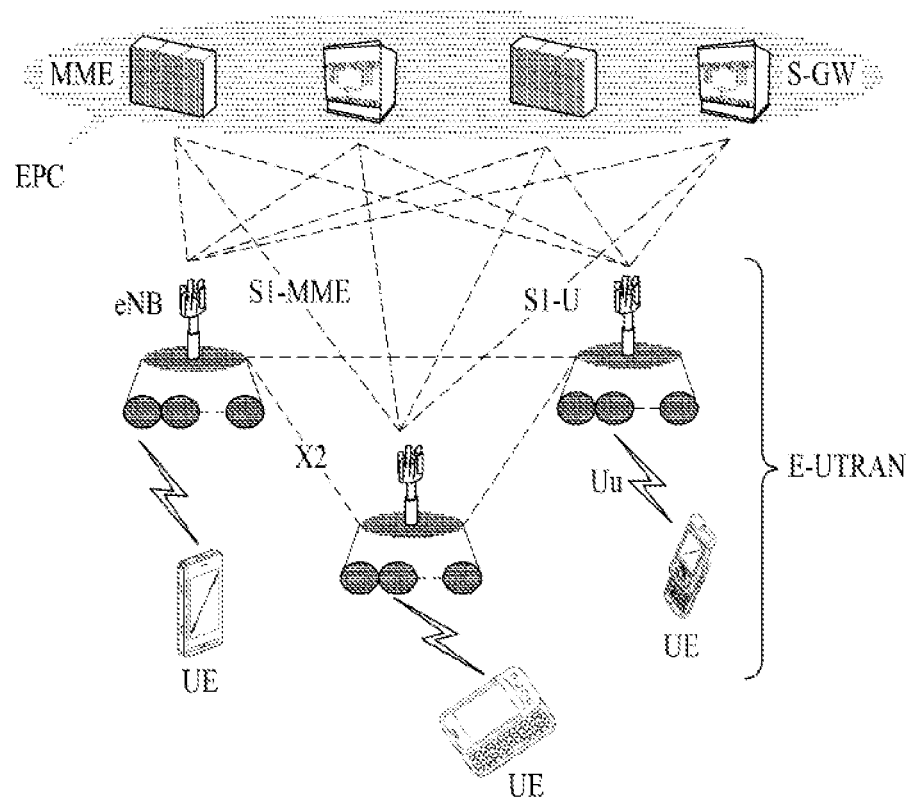
FIG. 1 is a network architecture of an LTE system which is an example of a mobile communication system.
Figure 2:
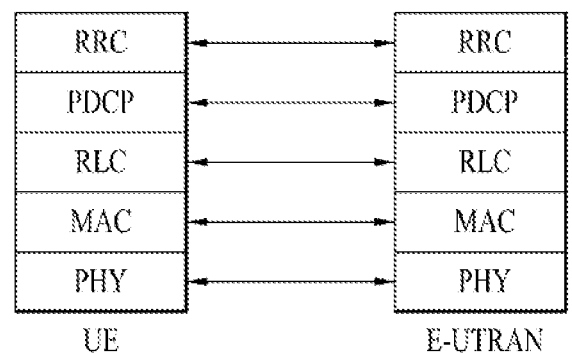
FIGS. 2 and 3 are diagrams showing the structure of a radio interface protocol between a UE and an E-UTRAN in an LTE system.
Figure 3:
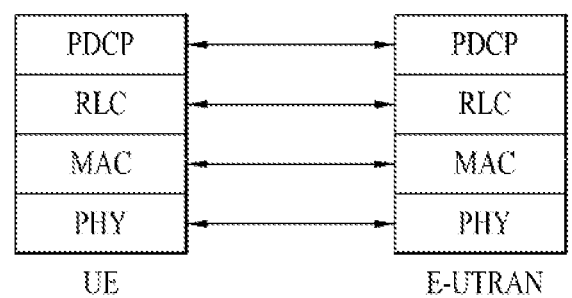

The configuration, operation and other features of the present invention will be understood by the embodiments of the present invention described with reference to the accompanying drawings. The following embodiments are examples of applying the technical features of the present invention to a 3rd Generation Partnership Project (3GPP) system. FIGS. 2 and 3 are diagrams showing the structure of a radio interface protocol between a UE and an E-UTRAN in an LTE system. The layers of the radio interface protocol of FIGS. 2 and 3 will now be described.

The physical layer (PHY), which is the first layer, provides an information transfer service to a higher layer using a physical channel. The PHY layer is connected to a Media Access Control (MAC) layer, located above the physical layer, through a transport channel. Data is transferred between the MAC layer and the PHY layer through the transport channel. The transport channel is roughly divided into a dedicated transport channel and a common transport channel, depending on whether or not a channel is shared. Data transfer between different PHY layers, specifically between the respective PHY layers of transmitting and receiving sides, is performed through the physical channel.

Various layers may be located in a second layer. The MAC layer serves to map various logical channels to various transport channels. The MAC layer performs a logical channel multiplexing function for mapping several logical channels to one transport channel. The MAC layer is connected to a Radio Link Control (RLC) layer, which is a higher layer, via a logical channel, and the logical channel may be roughly divided into a control channel for transmitting information about the control plane and a traffic channel for transmitting information about the user plane, according to the type of transmitted information.

The RLC layer of the second layer segments and concatenates data received from a higher layer, thereby controlling a data size so as to be suitable for a lower layer to transmit data via a radio interface. The RLC layer provides three modes, namely, a transparent mode (TM), an unacknowledged mode (UM) and an acknowledged Mode (AM) to support various QoSs requested by each radio bearer (RB). Especially, for reliable data transmission, the AM RLC performs a retransmission function using an automatic repeat request (ARQ) scheme.

A packet data convergence protocol (PDCP) layer located at the second layer is used to efficiently transmit IP packets, such as IPv4 or IPv6 packets, in a radio interface with a relatively narrow bandwidth. For this purpose, the PDCP layer reduces the size of an IP packet header which is relatively great in size and includes unnecessary control information, namely, performs a function called header compression. Accordingly, only necessary information can be included in the header part of data for transmission, so as to increase a transmission efficiency of a radio interface. In the LTE system, the PDCP layer also performs a security function. The security function includes a ciphering function for preventing data monitoring from a third party, and an integrity protection function for preventing third party data manipulation.

A radio resource control (RRC) layer located at a lowest portion of the third layer is defined in the control plane. The RRC layer handles logical channels, transport channels and physical channels for the configuration, re-configuration and release of radio bearers. Here, a radio bearer (RB) denotes a logical path provided by the first and second layers of radio protocols for data transfer between the UE and the UTRAN. Generally, configuration of the RB indicates a process of regulating radio protocol layers and channel characteristics necessary for providing a specific service, and configuring specific parameters and operation methods. The RB is divided into a signaling RB (SRB) and a data RB (DRB). The SRB is used as a path through which an RRC message is transmitted in a C-plane, while the DRB is used as a path through which user data is transmitted in a U-plane.

Downlink transport channels for transmitting data from a network to a UE may include a Broadcast Channel (BCH) for transmitting system information and a downlink Shared Channel (SCH) for transmitting other user traffic or control messages. Traffic or control messages of a downlink multicast or broadcast service may be transmitted either via a downlink SCH, or via a separate downlink Multicast Channel (MCH).

In addition, uplink transport channels for transmitting data from a UE to a network may include a Random Access Channel (RACH) for transmitting an initial control message and an uplink Shared Channel (SCH) for transmitting user traffic or control messages.

Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. The length of one subframe is 0.5 ms and a transmission time interval (TTI) which is a time unit for transmitting data is 1 ms which corresponds to two subframes.

Hereinafter, radio link failure (RLF) will be described.

A UE may determine that RLF has occurred if the following problems occur.

(1) First, it may be determined that RLF has occurred due to a physical channel problem.

A UE may determine that an out-of-sync problem has occurred in a physical channel if the quality of a reference signal (RS) periodically received from an eNB through the physical channel is equal to or less than a threshold. If a predetermined number (e.g., N310) of out-of-sync problems occurs, the physical layer informs an RRC layer that the out-of-sync problems have occurred. The RRC layer which receives the out-of-sync message from the physical layer operates a timer T310 and waits for the problem of the physical channel to be solved while the timer T310 is operated. If the RRC layer receives a message indicating that a predetermined number (e.g., N310) of consecutive in-sync problems has occurred from the physical layer while the timer T310 is operated, the RRC layer determines that the problem of the physical channel has been solved and stops the timer T310. However, if the in-sync message is not received before the timer T310 expires, the RRC determines that RLF has occurred.

(2) It may be determined that RLF has occurred due to a MAC random access problem.

A UE performs a procedure including a random access resource selection step, a random access preamble transmission step, a random access response reception step and a contention resolution step when performing a random access procedure at the MAC layer. If such a random access procedure is not successfully performed, a next random access procedure is performed after a back-off time. However, if a predetermined number (e.g., preambleTransMax) of random access procedures is not successfully performed, the MAC layer informs the RRC layer that the random access procedure is not successfully performed and the RRC layer determines that RLF has occurred.

(3) It may be determined that RLF has occurred due to a maximum RLC retransmission problem.

A UE retransmits an RLC PDU which is not successfully transmitted if an AM RLC layer of an RLC layer is used. Although the AM RLC layer retransmits a specific AMD PDU a predetermined number of times (e.g., maxRetxThreshold), if transmission is not successfully performed, the AM RLC layer informs the RRC layer that transmission is not successfully performed and the RRC layer determines that RLF has occurred.

The RRC layer determines that RLF has occurred when the above three problems occur. If RLF has occurred, an RRC connection re-establishment procedure for re-establishing RRC connection with an eNB is performed.

An RRC connection re-establishment procedure which is performed when RLF occurs is as follows.

If it is determined that a serious problem occurs in RRC connection, a UE performs an RRC connection re-establishment procedure in order to re-establish connection with an eNB. Serious problems which occur in RRC connection include the following five problems, that is, (1) radio link failure (RLF), (2) handover failure, (3) mobility from E-UTRA, (4) PDCP integrity check failure, (5) RRC connection reconfiguration failure.

If one of the above problems occurs, the UE operates a timer T311 and starts an RRC connection re-establishment procedure. During this process, the UE performs a cell selection procedure and a random access procedure and then accesses a new cell.

If an appropriate cell is detected through the cell selection procedure while the timer T311 is running, the UE stops the timer T311 and starts the random access procedure. However, if an appropriate cell is not detected before the timer T311 expires, the UE determines that RRC connection failure has occurred and enters to an RRC_IDLE mode.

Figure 4:
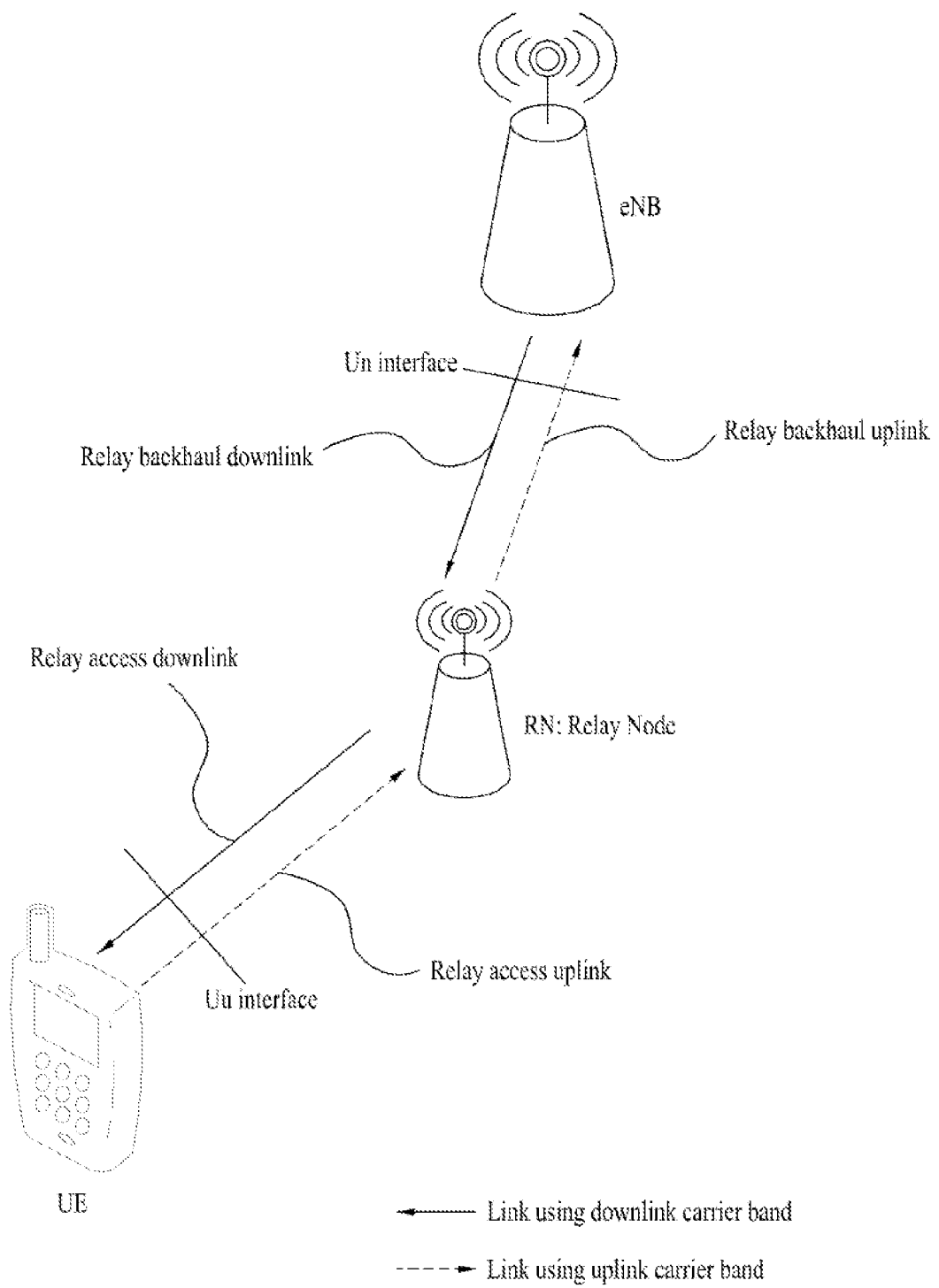
FIG. 4 is a diagram showing the configuration of a relay node, a Un interface, a relay backhaul link and a relay access link in a wireless communication system.

FIG. 4 is a diagram showing the configuration of a relay node, a Un interface, a relay backhaul link and a relay access link in a wireless communication system.

Relay technology relays data between a UE and an eNB. In an LTE system, if a UE is located a considerable distance from an eNB, communication is not smoothly performed. In order to solve this problem, relay technology was introduced in an LTE-A system. By using relay technology in a cell edge region in which a channel state of an eNB is inferior, a high-speed data channel can be provided and a cell service region can be extended.

In order to achieve such relay technology, a new network node called a relay node (RN) was introduced between a UE and an eNB. An eNB for managing the RN is referred to as a donor eNB (DeNB). A newly generated interface between the RN and the DeNB is defined as a Un interface and is different from a Uu interface between a UE and a network node. FIG. 4 shows the concept of the RN and the Un interface.

Instead of the DeNB, the RN serves to manage the UE. That is, the UE regards the RN as the DeNB. Thus, in the Uu interface between the UE and the RN, MAC/RLC/PDCP/RRC which is Uu interface protocol used in the conventional LTE system is used without change.

The DeNB regards the RN as the UE or the eNB according to situation. That is, when the RN firsts accesses the DeNB, since the DeNB is not aware of presence of the RN, the RN accesses the DeNB through the random access procedure as in the UE. After the RN accesses the DeNB, the RN operates like an eNB which manages the UE connected thereto. Accordingly, the Un interface protocol not only has a Uu interface protocol but also a network protocol function.

While the conventional RN technology was limited to the function of a repeater for amplifying and transmitting a signal, recently, RN technology has been developed into a more intelligent form of technology. Further, the RN technology is necessary to reduce costs required for installing more eNBs and costs required for maintaining a backhaul network in a next-generation mobile communication system, enlarge a service coverage and improve data throughput. As RN technology has been increasingly developed, an RN used in the conventional wireless communication system needs to be supported in a new wireless communication system.

As a function for forwarding link connection between an eNB and a UE to an RN has been introduced in a $3^{rd}$ Generation Partnership Project Long Term Evolution-Advanced (3GPP LTE-A) system, two links having different attributes are applied to uplink and downlink carrier frequency bands. A connection link set between the eNB and the RN is referred to as a backhaul link, Frequency Division Duplex (FDD) or Time Division Duplex (TDD) transmission using downlink resources is referred to as a backhaul downlink, and FDD or TDD transmission using uplink resources is referred to as a backhaul uplink.

Referring to FIG. 4, as an RN is introduced in order to forward link connection between an eNB and a UE, two links having different attributes are applied to uplink and downlink carrier frequency bands. A connection link set between the eNB and the RN is referred to as a relay backhaul link. A backhaul link for performing transmission using downlink frequency bands (in case of FDD) or downlink subframes (in case of TDD) as resources is referred to as a backhaul downlink and a backhaul link for performing transmission using uplink frequency bands (in case of FDD) or uplink subframes (in case of TDD) as resources is referred to as a backhaul uplink.

A connection link set between an RN and a series of UEs is referred to as a relay access link. A relay access link for performing transmission using downlink frequency bands (in case of FDD) or downlink subframes (in case of TDD) as resources is referred to as an access downlink and a relay access link for performing transmission using uplink frequency bands (in case of FDD) or uplink subframes (in case of TDD) as resources is referred to as an access uplink.

The RN may receive information from the eNB through the relay backhaul downlink and transmit information to the eNB through the relay backhaul uplink. The RN may transmit information to the UE through the relay access downlink and receive information from the UE through the relay access uplink.

In association with the use of the band (or the spectrum) of the RN, the case where the backhaul link operates in the same frequency band as the access link is referred to as "in-band" and the case where the backhaul link and the access link operate in different frequency bands is referred to as "out-band". A UE (hereinafter, referred to as a legacy UE) which operates according to the existing LTE system (e.g., Release-8) must access a DeNB both in in-band and out-band.

The RN may be classified into a transparent RN or a non-transparent RN depending on whether or not the UE recognizes the RN. The term "transparent" indicates that the UE does not recognize whether communication with a network is performed through the RN and the term "non-transparent" indicates that the UE recognizes whether communication with a network is performed through the RN.

In association with control of the RN, the RN may be divided into a RN configured as a part of a DeNB and an RN for controlling a cell.

The RN configured as a part of the DeNB has a RN ID, but does not have a cell identity. If at least a part of radio resource management (RRM) is controlled by an eNB belonging to a DeNB, (although the remaining part of the RRM is located at the RN), the RN is configured as a part of the DeNB. Preferably, such an RN may support a legacy UE. For example, examples of such an RN include various RNs such as smart repeaters, decode-and-forward relays or L2 (second layer) RNs and type-2 RNs.

The RN for controlling the cell controls one or several cells, provides a unique physical layer cell identity to each cell controlled by the RN, and uses the same RRM mechanism. From the viewpoint of the UE, there is no difference between accessing the cell controlled by the RN and accessing the cell controlled by the general eNB. Preferably, the cell controlled by the RN may support a legacy UE. Examples of such an RN include a self-backhauling RN, an L3 (third layer) RN, a type-1 RN and a type-1a RN.

The type-1 RN is an in-band RN for controlling a plurality of cells. From the viewpoint of the UE, the plurality of cells is regarded as cells distinguished from a DeNB. Each of the plurality of cells has a physical cell ID (defined in LTE Release-8) and the RN may transmit a synchronization channel thereof, a reference signal, etc. The UE may directly receive scheduling information and HARQ feedback from the RN and transmit a control channel (a scheduling request (SR), a CQI, ACK/NACK, etc.) thereof to the RN in a single cell. Legacy UEs (a UE which operates according to the LTE Release-8 system) regard the type-1 RN as a legacy eNB (a base station which operates according to the LTE Release-8 system), that is, has backward compatibility. UEs which operate according to the LTE-A system regard the type-1 RN as an eNB different from the legacy eNB, thereby improving performance.

The type-1a RN has the same features as the type-1 RN except that the RN operates as an out-band RN. The operation of the type-1a RN may be configured such that influence on the operation of L1 (first layer) is minimized or eliminated.

The type-2 RN is an in-band RN which does not have a separate physical cell ID and thus does not form a new cell. The type-2 RN is transparent to a legacy UE and a legacy UE recognizes presence of the type-2 RN. The type-2 RN may transmit a PDSCH, but may not transmit at least a CRS and a PDCCH.

In order to enable an RN to operate as an in-band RN, some time-frequency resources must be reserved for a backhaul link and may be set so as not to be used for an access link. This is referred to as resource partitioning.

The general principle of resource partitioning in the RN will now be described. A backhaul downlink and an access downlink may be multiplexed on one carrier frequency using a time division multiplexing (TDM) method (that is, only one of the backhaul downlink or the access downlink is activated at a specific time). Similarly, a backhaul uplink and an access uplink may be multiplexed on one carrier frequency using a TDM method (that is, only one of the backhaul uplink or the access uplink is activated in a specific timeframe).

Multiplexing of a backhaul link in FDD indicates that backhaul downlink transmission is performed in a downlink frequency band and backhaul link transmission is performed in an uplink frequency band. Multiplexing of a backhaul link in TDD indicates that backhaul downlink transmission is performed in a downlink subframe of an eNB and an RN and backhaul uplink transmission is performed in an uplink subframe of an eNB and an RN.

In case of an in-band RN, for example, if reception of a backhaul downlink from an eNB and transmission of an access downlink to a UE in a predetermined frequency band are simultaneously performed, a signal transmitted from a transmitter of the RN may be received by a receiver of the RN and thus signal interference or RF jamming may occur in an RF front end of the RN. Similarly, if reception of an access uplink from a UE and transmission of a backhaul uplink to an eNB in a predetermined frequency band are simultaneously performed, signal interference may occur in an RF front end of the RN. Accordingly, it is difficult to perform simultaneous transmission/reception by the RN in one frequency band unless a received signal and a transmitted signal are sufficiently separated (e.g., unless a transmission antenna and a reception antenna are sufficiently geographically separated (for example, the transmission and reception antennas are respectively mounted on and below the ground).

In order to solve a signal interference problem, an RN does not transmit a signal to a UE while receiving a signal from a DeNB. That is, a gap is generated in transmission from the RN to the UE and no signal is transmitted from the RN to the UE (including a legacy UE) during the gap. Such a gap may be set to configure a multicast broadcast single frequency network (MBSFN) subframe.

Figure 5:
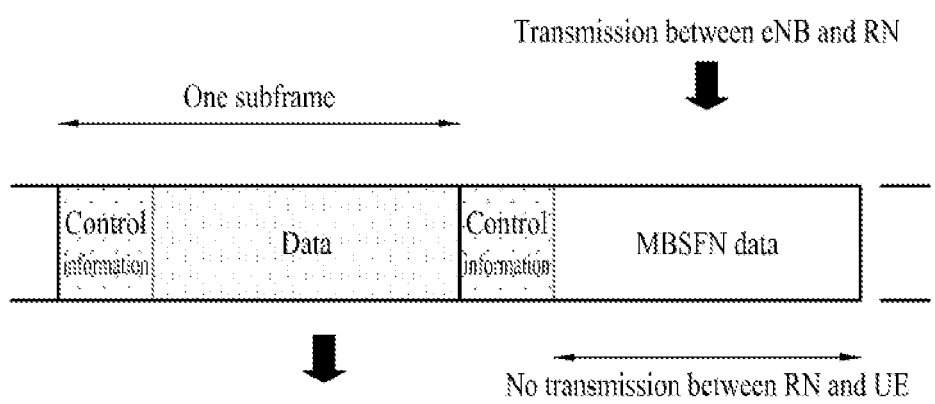
FIG. 5 is a diagram showing an example of relay node resource partitioning.

FIG. 5 is a diagram showing an example of RN resource partitioning.

In FIG. 5, a first subframe on the left may be a general subframe in which a downlink (i.e., access downlink) control signal and data are transmitted from an RN to a UE, and a second subframe on the right may be an MBSFN subframe in which a control signal is transmitted from an RN to a UE in a control region of a downlink subframe and no signal is transmitted from the RN to the UE in the remaining region of the downlink subframe. In case of a legacy UE, since transmission of a physical downlink control channel (PDCCH) is expected in all downlink subframes (that is, since the RN needs to enable all legacy UEs within the coverage area thereof to receive the PDCCH so as to perform a measurement function), the PDCCH needs to be transmitted in all downlink subframes, for the accurate operation of the legacy UE.

Accordingly, even on a subframe (second subframe) set for downlink (that is, backhaul downlink) transmission from an eNB to an RN, the RN does not receive a backhaul downlink, but transmits an access downlink in N first (N=1, 2 or 3) OFDM symbols of the subframe. In contrast, since a PDCCH is transmitted from the RN to the UE in the control region of the second subframe, backward compatibility with a legacy UE served by the RN may be provided. In the remaining region of the second subframe, no signal is transmitted from the RN to the UE and thus the RN may receive a signal from the eNB at this time. Accordingly, using such a resource partitioning method, the in-band RN does not simultaneously perform access downlink transmission and backhaul downlink reception.

The second subframe will now be described in detail. The control region of the second subframe may be referred to as an RN non-hearing interval. The RN non-hearing interval refers to an interval in which the RN does not receive a backhaul downlink signal and transmits an access downlink signal. This interval may be set to 1, 2 or 3 OFDMs as described above. The RN may transmit an access downlink to the UE in the RN non-hearing interval and receive a backhaul downlink from the eNB in the remaining region. At this time, since the RN may not simultaneously perform transmission and reception in the same frequency band, it takes considerable time to switch the RN from a transmission mode to a reception mode. Accordingly, a guard time (GT) needs to be set such that the RN is switched between the transmission mode and the reception mode in a first part of a backhaul downlink reception region. Similarly, even when the RN receives a backhaul downlink from the eNB and transmits an access downlink to the UE, a GT for switching the RN between the transmission mode and the reception mode may be set. The length of the GT may be a time region value, for example, k (k≥1) time sample value Ts or one or more OFDM symbols. In the case where RN backhaul downlink subframes are continuously set or according to a predetermined subframe alignment relationship, the GT of a last part of the subframe may not be defined or set. Such a GT may be defined only in a frequency region which is set for backhaul downlink subframe transmission, in order to maintain backward compatibility (if the GT is set in an access downlink interval, a legacy UE is not supported). In a backhaul downlink reception interval excluding the GT, the RN may receive a PDCCH and a PDSCH dedicated to the RN from the eNB, which may be expressed by R-PDCCH (Relay-PDCCH) and R-PDSCH (Relay-PDSCH) because they are physical channels dedicated to the RN.

The RN may be roughly divided into an in-band RN and an out-band RN as described above. In the in-band RN, a Un interface and a Uu interface use the same frequency. In this case, it is necessary to allocate dedicated subframes respectively used by the interfaces such that transmission/reception of the Un interface and transmission/reception of the Uu interface do not cause interference with each other. Hereinafter, an uplink/downlink subframe allocated for enabling the RN to communicate with the DeNB is referred to as an "RN subframe." That is, the RN performs data transmission/reception through the Un interface using the RN subframe and performs data transmission/reception through the Uu interface using the remaining subframe excluding the RN subframe.

Since the RN is wirelessly connected to the DeNB through the Un interface, a problem (e.g., an out-of-sync problem, radio link failure, etc.) may occur in a radio channel of the Un interface as in the Uu interface.

If a radio channel problem occurs in the Un interface, a problem may occur in data transmission/reception of all UEs under the control of the RN. Accordingly, the RN attempts to preferentially recover the Un interface.

However, in an in-band RN, data transmission/reception between the UE and the RN causes interference in recovery of connection between the RN and the DeNB. Accordingly, data transmission/reception to/from the UE must be reduced upon recovery of the connection between the RN and the DeNB and recovery of the connection between the RN and the DeNB must be performed using the RN subframe.

However, it is not decided how long the RN maintains the Uu interface and when the recovery of the Un interface is performed using the RN subframe. If the Uu interface is continuously maintained when a problem occurs in the Un interface, since the Un interface is recovered using only the RN subframe. Thus, the recover of the Un interface is delayed.

In contrast, if the RN subframe is immediately released when a problem occurs in the Un interface, since the Uu interface must be also immediately released in order to prevent interference, signaling overhead and time delay occur in order to establish RRC connection with a UE using the Uu interface after the recovery of the Un interface.

Accordingly, the present invention proposes the following method to attempt recovery of the Un interface using the RN subframe at the RN while maintaining the Uu interface during a predetermined time when a radio channel problem occurs in the Un interface.

(1) If a radio channel problem occurs in the Un interface, a timer is running and, during the running of the timer, the Un interface is recovered using only the RN subframe while normally maintaining the Uu interface.

(2) If the recovery of the Un interface is successful before the timer expires, the Uu interface and the Un interface are normally maintained, but, if the recovery of the Un interface is not successful before the timer expires, the Uu interface is released, the RN subframe is released, and an attempt to connect the Un interface using a certain subframe is made.

Hereinafter, an operation for operating a timer and recovering an interface when an out-of-sync problem has occurred in a physical channel and RLF has occurred will be described in detail.

Figure 6:
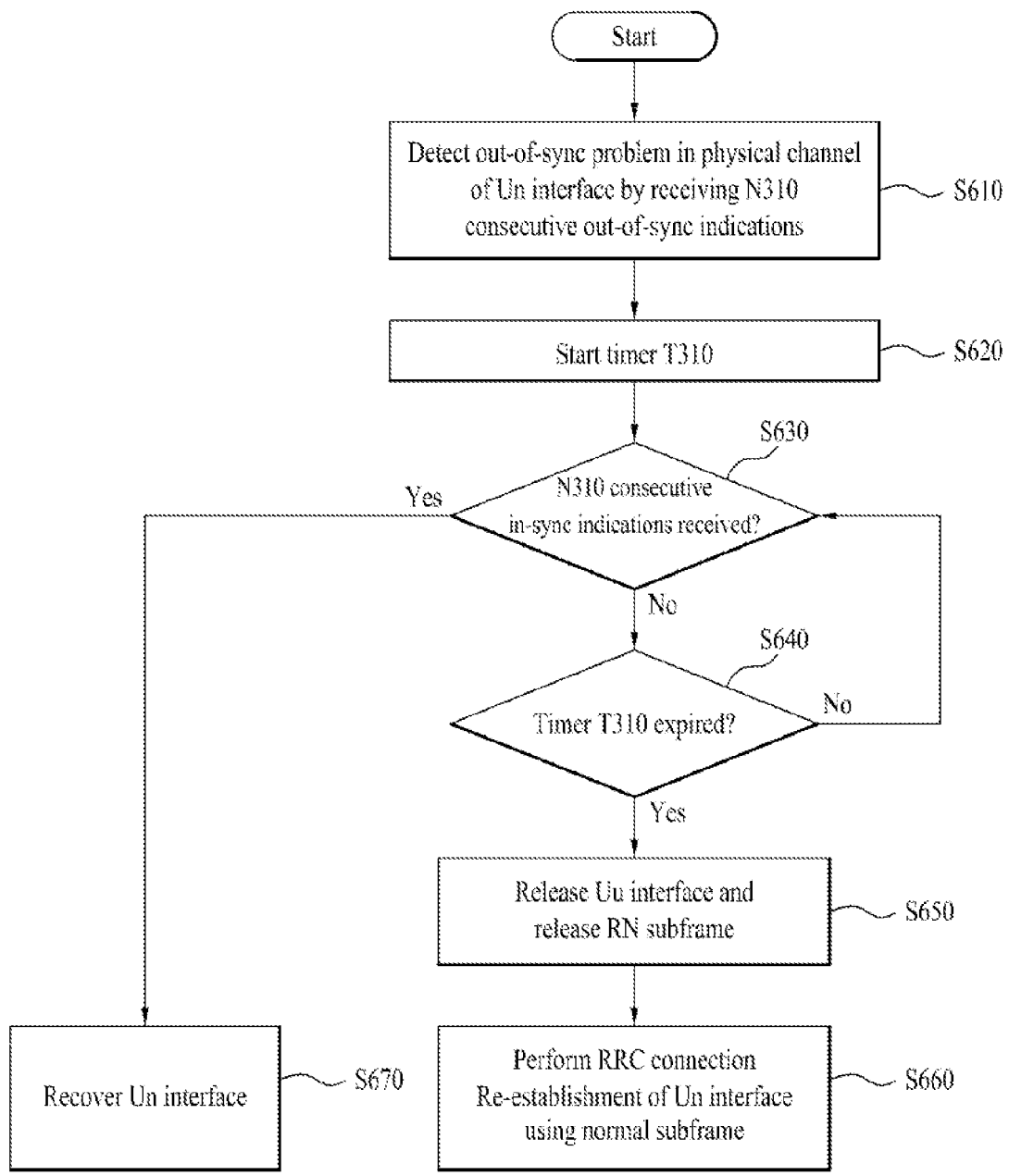
FIG. 6 is a flowchart illustrating the flow of an operation of a relay node when an out-of-sync problem occurs in a physical channel of a Un interface.

FIG. 6 is a flowchart illustrating the flow of an operation of a relay node when an out-of-sync problem occurs in a physical channel of a Un interface.

(1) The RN determines that an out-of-sync problem has occurred in the physical channel if N310 consecutive out-of-sync indications are received from the physical channel of the Un interface (S610).

The RN determines that the out-of-sync problem has occurred in the physical channel if the quality of the RS periodically received from the DeNB is less than or equal to a threshold as detected in the physical channel.

(2) If the out-of-sync problem has occurred in the physical channel, the RN operates the timer T310 (S620). When the out-of-sync problem has occurred in the physical channel, the timer is operated as a procedure for recovering the interface. When the out-of-sync problem has occurred in the physical channel, the timer T310 may be started.

(3) The RN determines whether N310 consecutive in-sync indications are received from the physical channel of the Un interface while the timer T310 is running (S630).

The RN determines that the Un interface has been recovered if a message indicating that a specific number (N310) of consecutive in-sync indications has occurred is received from the physical channel of the Un interface while the timer T310 is running.

Meanwhile, the RN maintains the Uu interface while the timer T310 is running. In addition, the RN transmits and receives data to and from the DeNB using the RN subframe. In addition, the RN performs interface recovery through the RN subframe.

(4) If the RN determines that the out-of-sync problem of the radio channel of the Un interface has been solved if it is determined that the N310 consecutive in-sync indications are received from the physical channel before the timer T310 expires in step S630, and performs normal operation (S670).

(5) It is determined whether the timer T310 has expired (S640).

(6) If the RN does not receive the N310 consecutive in-sync indications before the timer T310 expires, the Uu interface is released and the RN subframe is released (S650).

The RN releases the Uu RBs of all UEs of the Uu interface. In addition, the RN stops system information broadcast using the Uu interface.

(7) After the RN subframe is released, the RN performs the RRC connection re-establishment procedure to the DeNB using a normal subframe (S660).

Meanwhile, if the out-of-sync problem continues even when the timer T310 has expired, the RN determines that RLF has occurred and performs an RRC connection re-establishment procedure.

If the recovery of the Un interface is not successful before the timer expires, the RN subframe is released and an attempt to connect the Un interface using not only the RN subframe but also another subframe, that is, a normal subframe, is made. That is, the RN performs a random access procedure using a normal subframe.

Figure 7:
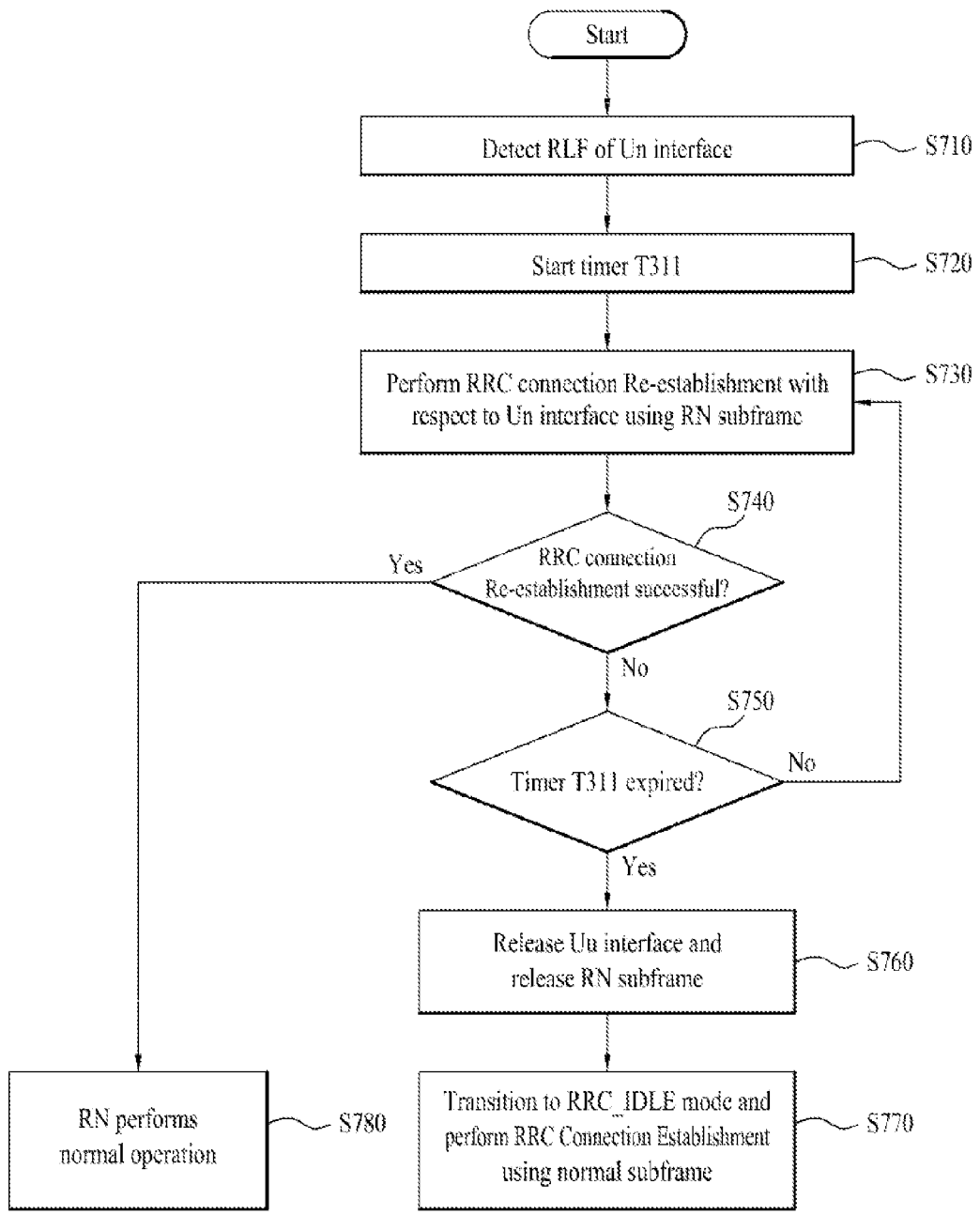
FIG. 7 is a flowchart illustrating the flow of an operation of a relay node when radio link failure occurs in a Un interface.

FIG. 7 is a flowchart illustrating the flow of an operation of a relay node when RLF occurs in a Un interface.

(1) The RN detects RLF of the Un interface (S710).

As described above, RLF occurs in the following three situations.

1) First, it may be determined that RLF has occurred if a specific number (N310) of consecutive in-sync indications is not received until a predetermined time elapses after a specific number (N310) of consecutive out-out-sync indications is received from the physical channel of the Un interface due to a problem of the physical channel. 2) Second, it may be determined that RLF has occurred if a predetermined number (preambleTransMax) of random access procedures is attempted using the Un interface but is not successful due to a MAC random access problem. 3) Third, it may be determined that RLF has occurred if the AM RLC layer of the Un interface retransmits a specific AMD PDU a predetermined number of times (e.g., maxRetxThreshold) but transmission is not successfully performed due to a maximum RLC retransmission problem.

(2) The RN operates the timer T311 (S720).

If RLF occurs, the RN operates the timer T311 and the timer value has a value equal to or greater than 0. The timer value is received from the DeNB when the RN first accesses the DeNB.

(3) The RN performs an RRC connection re-establishment procedure using the RN subframe in the Un interface while the timer T311 is running (S730).

If RLF occurs in the Un interface, the RN performs an RRC connection re-establishment procedure in order to re-establish connection with the DeNB. At this time, the RN performs RRC connection re-establishment using only a specific subframe. The specific subframe may be the RN subframe.

(4) It is determined whether the RRC connection re-establishment procedure is successful (S740).

(5) If the RN successfully performs the RRC connection re-establishment procedure before the timer T311 expires, the RN determines that RLF of the Un interface is solved and performs normal operation (S780).

(6) It is determined that the timer T311 has expired (S750).

If the timer T311 has not expired, the RRC connection re-establishment procedure is repeated.

(7) If the RN does not successfully perform the RRC connection re-establishment procedure before the timer T311 expires, the Uu interface is released and the RN subframe is released (S760).

Release the Un interface when the recovery of the Un interface is not successful before the timer expires includes the following process. That is, the RN releases the Uu RBs of all UEs and the RN stops system information broadcast over the Uu interface.

(8) The RN transitions to an RRC_IDLE mode and performs the RRC connection establishment procedure again with respect to the Un interface using a normal subframe (S770).

The RN determines that RRC connection failure has occurred when the timer expires and transitions to the RRC_IDLE mode. Thereafter, the RN performs the RRC connection re-establishment procedure to the DeNB using not only the RN subframe but also a normal subframe. When the timer T311 expires, 1) the RN releases the RN subframe, 2) the RN transitions to the RRC_IDLE mode, and 3) the RN stays in an appropriate new cell and performs a random access procedure for accessing the cell using a normal subframe.

The RN may minimize interference by controlling the Uu interface or the Un interface.

First, a method of minimizing interference by controlling the Uu interface of the RN will be described.

The RN transmits a stop message to UEs by dedicated or common signaling. When each UE receives the stop message, each UE may stop all RBs and processes. If the RBs are stopped, a PDCP SDU discarding timer may be operated.

System information may indicate the state of the RN and the state of the RN may include a normal state, a recovery state and an idle state. 1) If the UE determines that the RN state is in the recovery state, all RBs and processes may be stopped. 2) If the UE determines that the RN state is in the idle state, the UE releases all RBs, transitions to the idle state, and searches for another cell in order to establish RRC connection. 3) If the UE determines that the RN state is in the normal state, the UE resumes all the stopped RBs and processes.

The RN does not allocate a UL grant to the UE. Even when the RN receives a buffer status report, a scheduling request or a random access preamble, the RN does not respond to the request of the UE. That is, the RN does not allocate the UL grant to the UE.

The RN instructs the UE to transition to a discontinuous reception (DRX) state. The RN may instruct the UE to transition from a continuous state to a long DRX state.

Next, a method of minimizing interference by controlling the Un interface of the RN will be described.

While RRC connection re-establishment is performed, that is, before the timer T311 expires, UL transmission is performed using a MBSFN subframe.

While the timer T311 is running, the RN performs UL transmission only using the MBSFN subframe. When the RN performs a random access procedure while the timer T311 is running, the RN uses a previously allocated random access (RA) preamble. The RA preamble is previously allocated by the DeNB so as to be used by the RN in the event of an emergency such as RLF.

If the timer expires, that is, if RRC connection re-establishment fails, the RN may perform UL transmission using a normal subframe, not using a specific subframe. That is, the RN may perform UL transmission not only using a MBSFN subframe but also using another subframe after the timer T311 has expired.

Figure 8:
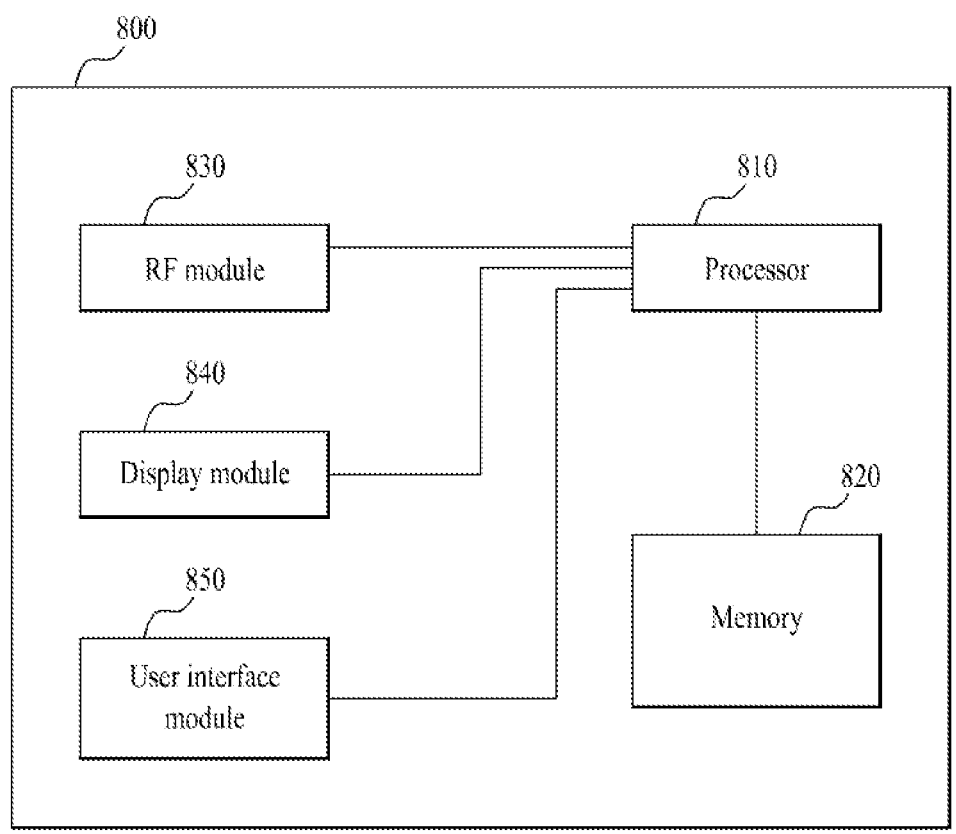
FIG. 8 is a block diagram of a communication device according to an embodiment of the present invention.

FIG. 8 is a block diagram of a communication device according to an embodiment of the present invention.

Referring to FIG. 8, the communication device 800 includes a processor 810, a memory 820, an RF module 830, a display module 840 and a user interface module 850.

The communication device 800 is shown for convenience of description and some modules may be omitted. The communication device 800 may further include necessary modules. Some modules of the communication device 800 may be subdivided. The processor 810 is configured to perform operation according to the embodiments of the present invention described with reference to the drawings. More specifically, for the detailed operation of the processor 810, refer to the description of FIGS. 1 to 6.

The memory 820 is connected to the processor 810 and is configured to store an operating system, an application, program code and data. The RF module 830 is connected to the processor 810 and is configured to convert a baseband signal into a radio signal or convert a radio signal into a baseband signal. For conversion, the RF module 830 performs analog conversion, amplification, filtering frequency up-conversion or inverse processes thereof. The display module 840 is connected to the processor 810 and is configured to display a variety of information. The display module 840 may include, but is not limited to, well-known elements such as a liquid crystal display (LCD), a light emitting diode (LED) and an organic light emitting diode (OLED). The user interface module 850 is connected to the processor 810 and is configured by a combination of well-known user interfaces such as a keypad and a touchscreen.

The aforementioned embodiments are achieved by combination of structural elements and features of the present invention in a predetermined manner. Each of the structural elements or features should be considered selective unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to other claims other than the specific claims to constitute the embodiment or new claims may be added by means of amendment after the application is filed.

The embodiments of the present invention are disclosed on the basis of a data communication relationship between a base station and a relay node. Specific operations to be conducted by the base station in the present invention may also be conducted by an upper node of the base station as necessary. In other words, it will be obvious to those skilled in the art that various operations for enabling the base station to communicate with the UE in a network composed of several network nodes including the base station will be conducted by the base station or other network nodes other than the base station. The term "Base Station" may be replaced with the term fixed station, Node-B, eNode-B (eNB), or access point as necessary.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software codes may be stored in a memory unit so that it can be driven by a processor. The memory unit is located inside or outside of the processor, so that it can communicate with the aforementioned processor via a variety of well-known parts.

Although a method for processing a signal at a radio node in a wireless communication system and an apparatus thereof according to the present invention is applied to a 3GPP LTE system, the present invention is applicable to various wireless communication systems in addition to the 3GPP LTE system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for operating a device relay node in a wireless communication system, the method comprising:
    communicating, by the relay node, with a base station using a radio resource in a subframe configured for the relay node only;
    detecting, by the relay node, a problem with a connection between the relay node and the base station by detecting consecutive out-of-sync indications;
    starting, by the relay node, a timer upon detecting the problem with the connection between the relay node and the base station; and
    releasing, by the relay node, a restriction of using the subframe configured for the relay node only, when the timer expires.

2. The method of claim 1, wherein the problem with the connection between the relay node and the base station is associated with a radio link failure.

3. The method of claim 1, further comprising:
    communicating, by the relay node, with the base station using any subframe when the started timer expires.

4. The method of claim 1, wherein the step of releasing the restriction comprises:
    releasing a configuration of using the subframe configured for the relay node only.

5. The method of claim 1, further comprising:
    performing, by the relay node, a recovery of the problem with the connection between the relay node and the base station while the timer is running.

6. The method of claim 5, wherein the timer is stopped when the problem with the connection between the relay node and the base station is recovered.

7. The method of claim 6, wherein the problem with the connection between the relay node and the base station is recovered after detecting consecutive in-sync indications.

8. A node in a wireless communication system, the relay node comprising:
    a timer; and a processor operatively connected to the timer and configured to:
communicate with a base station using a radio resource in a subframe configured for the relay node only,
detect a problem with a connection between the relay node and the base station by detecting consecutive out-of-sync indications,
start the timer upon detecting the problem with the connection between the relay node and the base station, and
release a restriction of using the subframe configured for the relay node only, when the timer expires.

9. The relay node of claim 8, wherein the problem with the connection between the relay node and the base station is associated with a radio link failure.

10. The relay node of claim 8, wherein the processor is further configured to communicate with the base station using any subframe when the timer expires.

11. The relay node of claim 8, wherein a configuration of using the subframe configured for the relay node only is released when the timer expires.

12. The relay node of claim 8, wherein the processor is further configured to perform a recovery of the problem with the connection between the device relay node and the base station while the timer is running.

13. The relay node of claim 12, wherein the timer is stopped when the problem with the connection between the relay node and the base station is recovered.

14. The relay node of claim 13, wherein the problem with the connection between the relay node and the base station is recovered after detecting consecutive in-sync indications.

\* \* \* \* \*